United States Patent
Shimizu et al.

(10) Patent No.: US 6,949,891 B2
(45) Date of Patent: Sep. 27, 2005

(54) LIGHT QUANTITY ADJUSTING METHOD, LIGHT QUANTITY ADJUSTING APPARATUS, AND IMAGE FORMING APPARATUS

(75) Inventors: Atsuko Shimizu, Kanagawa (JP); Takayuki Uemura, Kanagawa (JP); Yoshinori Katoh, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/995,104

(22) Filed: Nov. 24, 2004

(65) Prior Publication Data

US 2005/0116666 A1 Jun. 2, 2005

(30) Foreign Application Priority Data

Nov. 28, 2003 (JP) .................................. 2003-398644
Nov. 28, 2003 (JP) .................................. 2003-398868

(51) Int. Cl.$^7$ ............................................. H05B 37/02
(52) U.S. Cl. ...................... 315/300; 315/302; 315/291; 315/297
(58) Field of Search ................................ 315/300, 302, 315/291, 297, 360, 363; H05B 37/02

(56) References Cited

U.S. PATENT DOCUMENTS 6,711,352 B2 * 3/2004 Kohno et al. ................ 396/109
2002/0196418 A1 * 12/2002 Hagiwara et al. ............. 355/67

FOREIGN PATENT DOCUMENTS

JP          8-23422 A          1/1996

* cited by examiner

Primary Examiner—Trinh Vo Dinh
(74) Attorney, Agent, or Firm—Sughrue Mion, PLLC

(57) ABSTRACT

A light quantity adjusting method is used for driving a light emitting device with two drive current levels. The drive current levels are controlled by the first set data and the second set data, respectively. First, a resolution ratio and light quantity characteristics are stored. The resolution ratio represents a ratio between a drive current setting resolution of the first set data and a drive current setting resolution of the second set data. The light quantity characteristics represents a relationship between the first set data and a light emission quantity of the light emitting device. A value in the first set data is obtained as a first set value through adjustment for a quantity of light. Next, a change amount, from the first set value in the first set data is calculated using the light quantity characteristics. The calculated change amount is converted into a value in the second set data as a second set value using the resolution ratio.

6 Claims, 7 Drawing Sheets

LIGHT QUANTITY ADJUSTING METHOD, LIGHT QUANTITY ADJUSTING APPARATUS, AND IMAGE FORMING APPARATUS

This application claims priority on Japanese patent application No. 2003-398644 and No. 2003-398868, the entire contents of which are hereby incorporated by references.

BACKGROUND OF THE INVENTION

The present invention relates to a light quantity adjusting method which is carried out in advance when a light quantity level of emitted light from a light emitting device having a light emitting element such as a laser light source is changed over to another one, and a light quantity adjusting apparatus using the light quantity adjusting method, and also relates to an image forming apparatus for forming an image on a recording material using a laser light source or the like, to which the light quantity adjusting apparatus is applied. In particular, the present invention relates to an image exposure technique for, when a recording material for printing such as a thermal plate is exposed, determining a normal exposure power and an exposure power for an edge.

In the field of printing, there is generally used an image forming apparatus for focusing a laser beam on a recording material such as a photosensitive material as a recording material for printing to expose the recording material. For example, a Computer to Plate (CTP) process has been carried out, in which a digital image is formed using a computer, and during plate-making, an image is directly recorded on a printing plate without interposing a film. In the image forming apparatus used in such a CTP process or the like, from a viewpoint of a productive efficiency with which an image is formed on a recording material for a short time period, there is used a scanning system in which an image is formed with a laser beam while the recording material is relatively moved at a high speed with respect to the laser beam emitted from a laser light source. For example, a photosensitive material is exposed using the laser beam in correspondence to a digital image signal to record an image on the photosensitive material while the photosensitive material is held on a surface of a rotating drum.

With this technique, a lighting state of a light beam emitted from a light source for exposure is controlled using a binary coded image signal generated based on image data of an original image to be recorded, and a photosensitive material is two-dimensionally scanned with the light beam to record a desired image on the photosensitive material by moving the photosensitive material relative to the light source for exposure. The image for plate-making is a dot image using dots. The dot image is recorded in the form of a set of a large number of dots formed through scanning exposure using a light beam having a predetermined size in correspondence to the resolution.

When a single dot or a fine pattern such as a fine line is exposed using a short pulse in forming an image using this image forming apparatus, there arises a problem that since the exposure recording is carried out while the recording material is moved at a high speed, the exposure power (exposure energy density) corresponding to this movement is insufficient, and thus the fine pattern is not precisely exposed and recorded by a light beam. For example, when a negative photosensitive material as a recording material is exposed, photo-curing of an exposed portion of the negative photosensitive material does not sufficiently progress owing to insufficiency of the exposure power, and hence the dot, the fine line or the like is not precisely reproduced. In addition, when a positive photosensitive material as the recording material is exposed, the exposed portion of the positive photosensitive material such as the dot or the fine line, which becomes a non-image portion is not perfectly removed owing to the insufficiency of the exposure power.

Heretofore, the beam diameter of the laser beam is reduced and also the exposure power density is increased to cope with the above-mentioned problem. However, such methods cause another problem that an optical system is contaminated due to the ablation and the life-time of a semiconductor laser diode is shortened since the exposure power is increased. For this reason, the precise processing cannot be still executed for the fine pattern, and the life-time of the laser light source is shortened to increase the maintenance cost.

On the other hand, JP 8-23422 A discloses an image forming apparatus in which when turn-ON/OFF of emission of a laser beam is switched in correspondence to a fine pattern, a light quantity level of the emitted laser beam for a limited time period of at least one of a time period right after turn-ON and a time period right before turn-OFF is made higher than that for a time period other than that limited time period to allow an exposure recording edge (edge portion) of a fine pattern to be precisely exposed to the laser beam. That is to say, there is disclosed a system in which when an internal portion except for an edge portion is exposed, the light quantity level of the laser beam is set to a predetermined level and the exposure power is set to a normal exposure power, while when a dot of the edge portion of the image is exposed, the light quantity level of the laser beam is increased and the exposure power is set to a dot exposure power. That is, there is disclosed a so-called method of increasing a dot light quantity in which only for a certain time period of one or both of a time period right after rise of the pulse and a time period right before fall of the pulse, the exposure is carried out at a power higher than that in the normal exposure.

However, in the system disclosed in JP 8-23422 A, since the exposure power is changed between two stages, i.e., the normal exposure power and the dot exposure power, the light quantity of the laser beam must be adjusted to two levels of high light quantity level and low light quantity level. This requires the complicated work in which prior to the processing for forming an image on the recording material, the adjustment must be carried out twice, i.e., the light quantity of the laser beam must be adjusted to the high light quantity level and the low light quantity level. The light quantity adjustment must be carried out whenever the exposure recording is carried out, and whenever the recording material or a kind of recording material is changed over to another one. Thus, there arises a problem that when a plurality of recording materials are processed in large quantities, a total time period required to adjust the light quantity becomes long, and hence the light quantity adjustment process is inferior in productive efficiency with which an image is recorded on a recording material for a short time period.

SUMMARY OF THE INVENTION

The present invention has been made in order to solve the above-mentioned problems, and it is therefore an object of the present invention to provide a light quantity adjusting method and a light quantity adjusting apparatus which are capable of, when an image is exposed and recorded using the normal exposure power and dot exposure power as described above, adjusting a light quantity of an emitted light beam such as a laser beam without reducing a productive efficiency, and suppressing an error owing to time-dependent change of the apparatus, thereby allowing a photosensitive material to be exposed to record an image on the photosensitive material without reducing the productive efficiency, and an image forming apparatus for forming an image using the light quantity adjusting method.

The present invention provides a light quantity adjusting method, which is used for driving a light emitting device with a drive current at a first level which is generated in accordance with a modulation signal based on an image signal, and driving the light emitting device with a drive current obtained by adding a drive current at a second level to the drive current at the first level for at least one or both of a predetermined time period right after rise of the modulation signal and a predetermined time period right before fall of the modulation signal.

The light quantity adjusting method comprises the steps of: storing a resolution ratio between a drive current setting resolution of first set data used to determine the drive current at the first level and a drive current setting resolution of second set data used to determine the drive current at the second level, and light quantity characteristics representing a relationship between the first set data and a light emission quantity of the light emitting device; and adjusting the light emission quantity of the light emitting device, wherein a value in the first set data is obtained through adjustment for a quantity of light so that the light emission quantity of the light emitting device agrees with a first target value, the value is determined as a first set value used to determine the drive current at the first level, a change amount, from the first set value in the first set data, by which the light emission quantity of the light emitting device agrees with a second target value is calculated using the light quantity characteristics, the calculated change amount is converted into a value in the second set data using the resolution ratio, and the converted value is determined as a second set value used to determine the drive current at the second level. Thereby, the light quantity adjustment for obtaining the value in the first set data is carried out to simultaneously calculate and determine the second set data.

The present invention also provides a light quantity adjusting method, which is used for driving a light emitting device with a drive current at a first level which is generated in accordance with a modulation signal based on an image signal, and driving the light emitting device with a drive current obtained by adding a drive current at a second level to the drive current at the first level for at least one or both of a predetermined time period right after rise of the modulation signal and a predetermined time period right before fall of the modulation signal.

The light quantity adjusting method comprises the steps of: storing a resolution ratio between a drive current setting resolution of first set data used to determine the drive current at the first level and a drive current setting resolution of second set data used to determine the drive current at the second level; measuring light emission quantities of the light emitting device based on predetermined two set data which are set in advance to become higher in level than an oscillation threshold current of the light emitting device, but not to exceed in level a rated current of the light emitting device in adjustment of the light quantity, respectively, to calculate and store rates of change in light emission quantity of the light emitting device for the predetermined two set data; and calculating a value in the first set data as a first set value so that the light emission quantity of the light emitting device corresponding to the drive current at the first level agrees with a target value using the rate of change of the light emission quantity on a straight line connecting two points corresponding to the two set data obtained through the measurement, and calculating a value in the second set data as a second set value so that the light emission quantity of the light emitting device corresponding to the drive current at the second level agrees with a target value using the resolution ratio and the rate of change in the light emission quantity on the straight line. Thereby, the light emitting device is driven with the drive current at the first level and the drive current at the second level which are determined based on the first set value and the second set value obtained through the calculation to carry out the light quantity adjustment by which an error due to degradation or time-dependent change of a light emission efficiency is suppressed.

In the light quantity adjusting method, preferably, the rate of change in the light emission quantity of the light emitting device obtained through the calculation is a rate of change for the first set data, and the calculation of the second set value is carried out by calculating a change amount, from the first set value in the first set data, by which the light emission quantity of the light emitting device corresponding to the added drive current by the drive current at the second level agrees with the target value using the rate of change in the light emission quantity to convert the calculated change amount into the value in the second set data using the resolution ratio.

The present invention provide a light quantity adjusting apparatus for driving a light emitting device with a drive current at a first level generated in accordance with a modulation signal based on an image signal, and a drive current obtained by adding a drive current at a second level to the drive current at the first level. The light quantity adjusting apparatus comprises: storage means for storing in advance a resolution ratio between a drive current setting resolution of first set data used to determine the drive current at the first level and a drive current setting resolution of second set data used to determine the drive current at the second level, and for storing light quantity characteristics representing a relationship between the first set data and a light emission quantity of the light emitting device; a first set data calculating means for obtaining a value in the first set data through adjustment for a light quantity so that the light emission quantity of the light emitting device agrees with a first target value to determine the value as a first set value used to determine the drive current at the first level; and a second set data calculating means for calculating a change amount, from the first set value in the first set data, by which the light emission quantity of the light emitting device agrees with a second target value using the light quantity characteristics to convert the calculated change amount into a value in the second set data using the resolution ratio to determine the converted value as a second set value used to determine the drive current at the second level.

The light quantity adjusting apparatus preferably further comprises detection means for detecting rise and fall of the modulation signal, wherein the light emitting device is driven with the drive current at the first level generated in accordance with the modulation signal which is generated from the image signal and the light emitting device is driven with the drive current obtained by adding the drive current at the second level to the drive current at the first level for one or both of a predetermined time period right after the rise of the modulation signal and a predetermined time period right before the fall of the modulation signal.

The present invention also provide a light quantity adjusting apparatus for driving a light emitting device with a drive current at a first level generated in accordance with a modulation signal which is generated from an image signal, and a drive current obtained by adding a drive current at a second level to the drive current at the first level.

The light quantity adjusting apparatus comprises: light emission quantity measuring means for measuring light emission quantities of the light emitting device based on predetermined two set data which are set in advance to become higher in level than an oscillation threshold current of the light emitting device, but not to exceed in level a rated current; change rate calculating means for calculating a rate of change in a light emission quantity of the light emitting device for the predetermined two set data; storage means for storing a resolution ratio between a drive current setting resolution of first set data used to determine the drive current at the first level and a drive current setting resolution of second set data used to determine the drive current at the second level, and a rate of change in a light emission quantity of the light emitting device; a first set data calculating means for calculating a value in the first set data as a first set value so that the light emission quantity of the light emitting device corresponding to the first level agrees with a target value using the rate of change in the light emission quantity on a straight line connecting two points corresponding to the two set data obtained through the measurement by the light emission quantity measuring means; and a second set data calculating means for calculating a value in the second set data as a second set value so that the light emission quantity of the light emitting device corresponding to the added drive current by the drive current at the second level agrees with a target value using the resolution ratio between the two drive current setting resolutions and the rate of change in the light emission quantity on the straight line.

The light quantity adjusting apparatus preferably further comprises detection means for detecting rise and fall of the modulation signal, wherein the light emitting device is driven with the drive current at the first level generated in accordance with the modulation signal which is generated from the image signal and the light emitting device is driven with the drive current obtained by adding the drive current at the second level to the drive current at the first level for one or both of a predetermined time period right after the rise of the modulation signal and a predetermined time period right before the fall of the modulation signal to carry out the light quantity adjustment by which an error due to degradation or time-dependent change of a light emission efficiency is suppressed.

In the light quantity adjusting apparatus, preferably, the rate of change in the light emission quantity of the light emitting device obtained through the calculation by the change rate calculating means is a rate of change for the first set data, and the calculation of the second set value by the second set data calculating means is carried out by calculating a change amount, from the first set value in the first set data, by which the light emission quantity of the light emitting device corresponding to the added drive current by the drive current at the second level agrees with the target value using the rate of change in the light emission quantity to convert the calculated change amount into the value in the second set data using the resolution ratio.

The present invention provides an image forming apparatus for forming an image on a recording material using a light beam. The apparatus comprises: light emitting means having a light emitting device for emitting a light beam with a drive current generated in accordance with a modulation signal which is generated from an image signal; moving means for moving the recording material relative to the light emitting device; and a light quantity adjusting apparatus for driving the light emitting device with a drive current at a first level generated in accordance with the modulation signal, and a drive current obtained by adding a drive current at a second level to the drive current at the first level.

The light quantity adjusting apparatus comprises: storage means for storing in advance a resolution ratio between a drive current setting resolution of first set data used to determine the drive current at the first level and a drive current setting resolution of second set data used to determine the drive current at the second level, and for storing light quantity characteristics representing a relationship between the first set data and a light emission quantity of the light emitting device; a first set data calculating means for obtaining a value in the first set data through adjustment for a light quantity so that the light emission quantity of the light emitting device agrees with a first target value to determine the value as a first set value used to determine the drive current at the first level; a second set data calculating means for calculating a change amount, from the first set value in the first set data, by which the light emission quantity of the light emitting device agrees with a second target value using the light quantity characteristics to convert the calculated change amount into a value in the second set data using the resolution ratio to determine the converted value as a second set value used to determine the drive current at the second level; and detection means for detecting rise and fall of the modulation signal.

The present invention also provides an image forming apparatus for forming an image on a recording material using a light beam. The apparatus comprises: light emitting means having a light emitting device for emitting a light beam with a drive current generated in accordance with a modulation signal which is generated from an image signal; moving means for moving the recording material relative to the light emitting device; and a light quantity adjusting apparatus for driving the light emitting device with a drive current at a first level generated in accordance with the modulation signal based on the image signal, and a drive current obtained by adding a drive current at a second level to the drive current at the first level. The light quantity adjusting apparatus comprises: light emission quantity measuring means for measuring light emission quantities of the light emitting device based on predetermined two set data which are set in advance to become higher in level than an oscillation threshold current of the light emitting device, but not to exceed in level a rated current; change rate calculating means for calculating a rate of change in a light emission quantity of the light emitting device for the predetermined two set data; storage means for storing a resolution ratio between a drive current setting resolution of first set data used to determine the drive current at the first level and a drive current setting resolution of second set data used to determine the drive current at the second level, and a rate of change in a light emission quantity of the light emitting device; a first set data calculating means for calculating a value in the first set data so that the light emission quantity of the light emitting device corresponding to the first level agrees with a target value using the rate of change in the light emission quantity on a straight line connecting two points corresponding to the two set data obtained through the measurement by the light emission quantity measuring means; a second set data calculating means for calculating a value in the second set data so that the light emission quantity of the light emitting device corresponding to the added drive current by the drive current at the second level agrees with a target value using the resolution ratio between the two drive current setting resolutions and the rate of change in the light emission quantity on the straight line; and detection means for detecting rise and fall of the modulation signal.

According to the present invention, when the light is emitted in two stages of light quantity levels such as the normal exposure power and the dot exposure power, the light quantity adjustment has only to be carried out once. In addition, it is possible to suppress an error, between a target light quantity in increasing a dot light quantity and an actual output, which is caused owing to a fluctuation of a luminous differentiation efficiency of a semiconductor laser diode. Consequently, it is possible to suppress reduction in productive efficiency due to an increase in the number of times of the light quantity adjustment, and to efficiently adjust the light quantity of the emitted light such as a laser beam.

DETAILED DESCRIPTION OF THE PREFERRED EMBODIMENTS

A light quantity adjusting method, a light quantity adjusting apparatus and an image forming apparatus will hereinafter be described in detail based on preferred embodiments shown in the accompanying drawings.

Figure 1:
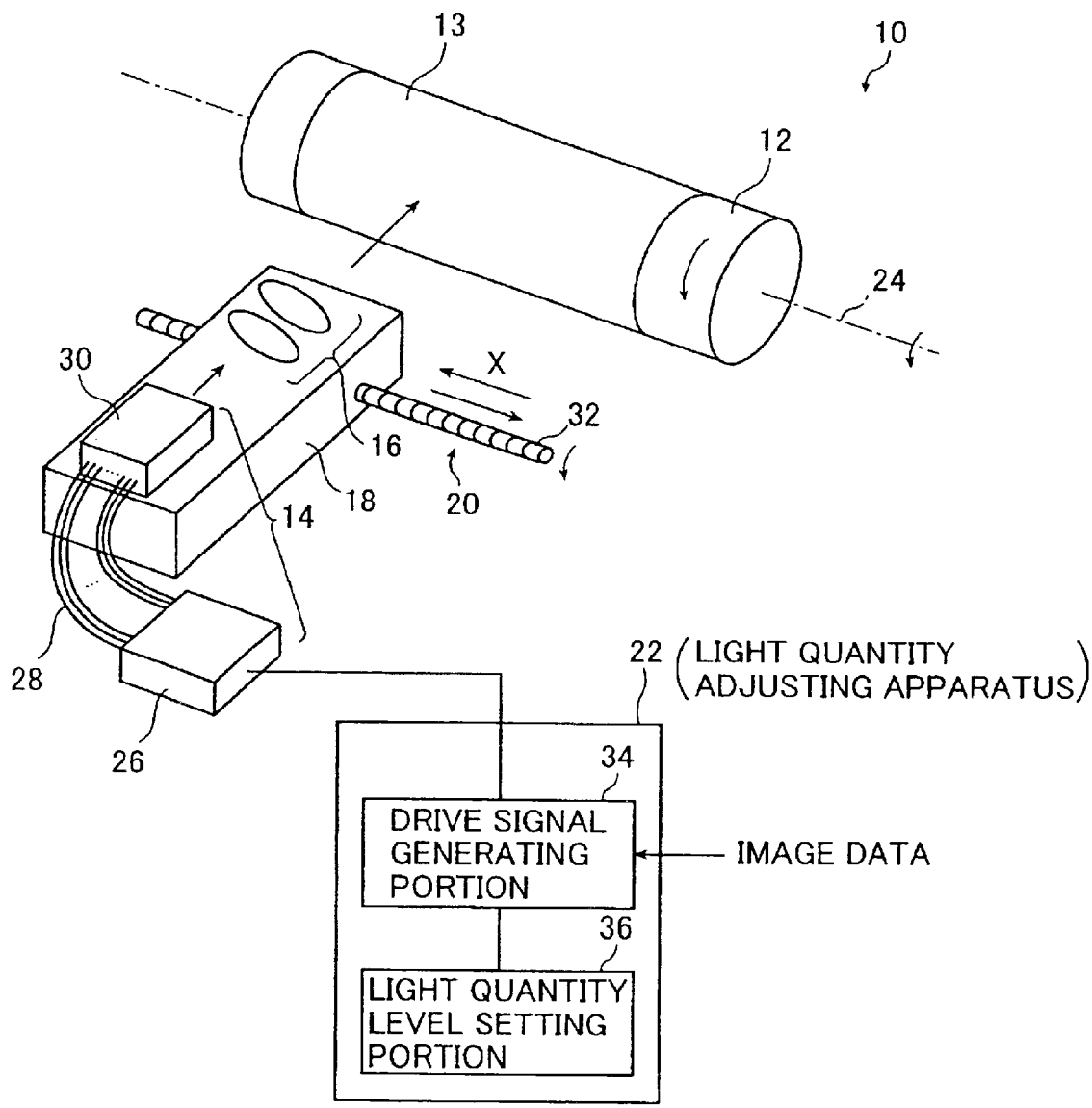
FIG. 1 is a schematic perspective view of an image forming apparatus according to an embodiment of the present invention.

FIG. 1 is a schematic perspective view showing a schematic construction of an image forming apparatus according to an embodiment of the present invention.

The image forming apparatus shown in FIG. 1 is a cylindrical outer drum scanning type light scanning apparatus in which a recording material is wrapped around an outer peripheral surface of a recording drum, and the recording material is scanned and exposed to a light beam to form an image on the recording material.

That is to say, as shown in FIG. 1, an image forming apparatus 10 includes a drum 12, a light emitting device 14, an optical system 16, a base stage 18 on which a part of the light emitting device 14 and the optical system 16 are fixedly placed, a movement mechanism 20 for moving the base stage 18 in a direction (indicated by an arrow X in the figure) of a rotation axis 24 of the drum 12, and a light quantity adjusting apparatus 22 for driving the light emitting device 14 so as to emit light at predetermined light quantity levels.

A recording material 13 is wrapped around the outer peripheral surface of the drum 12 to be fixed and held on the drum 12. A photosensitive material such as a PS plate is used as the recording material 13.

The light emitting device 14 is a so-called fiber coupling laser, and includes a light source portion 26 having semiconductor laser diodes, a plurality of fiber cables through which laser beams from the respective semiconductor laser diodes are transmitted, and a light emitting portion 30 for emitting laser beams in array from end faces, as light emitting faces, of the optical fiber cables 28 disposed in array.

The optical system 16 is constituted by a pair of lenses, and serves to focus the laser beams on a recording surface of the recording material 13. The base stage 18 has the light emitting portion 30 and the optical system 16 fixedly placed thereon and is adapted to be moved in the direction X of FIG. 1 by the movement mechanism 20. The movement mechanism 20 has a ball screw mechanism in which a ball screw 32 is adapted to be rotated by a drive motor (not shown) to be moved in the direction X of FIG. 1.

Thus, the recording material 13 is relatively moved in a direction (main scanning direction) of rotation of the drum 12 with respect to the laser beams emitted from the light emitting portion 30 to expose and record two-dimensionally an image on the recording material 13.

The light quantity adjusting apparatus 22 includes a drive signal generating portion 34 and a light quantity level setting portion 36.

The drive signal generating portion 34 receives an image signal representing image data to generate a modulation signal based on the received image signal in order to drive the light emitting device 14 in correspondence to the modulation signal. Thus, the drive signal generating portion 34 is connected to a plurality of semiconductor laser diodes in the light source portion 26.

The light quantity level setting portion 36 calculates first set data used to determine a drive current at a first level for driving of the light emitting device 14, and second set data used to determine a drive current at a second level for driving of the light emitting device 14 which is to be added to the drive current at the first level. The first and second set data thus calculated is sent to the drive signal generating portion 34 to generate the drive current at the first level and the drive current at the second level which are used to drive the light emitting device 14 based on the first and second set data. Note that the drive signal generating portion 34 and the light quantity setting portion 36 will be described in detail later.

Figure 2:
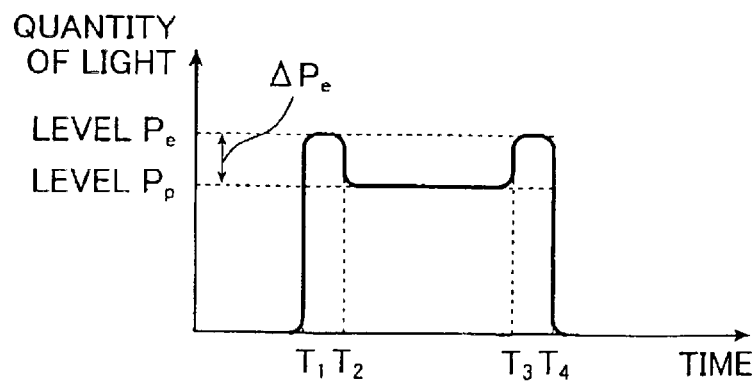
FIG. 2 is a graphical representation showing an example of a time waveform of a light quantity level of a laser beam emitted from the image forming apparatus shown in FIG. 1.

FIG. 2 is a diagram showing an optical output waveform when the light emitting device 14 is driven to emit the laser beams with the drive current at the first level and the drive current obtained by adding the drive current at the second level to the drive current at the first level in this embodiment. In an example shown in FIG. 2, the laser beams each at a light quantity level $P_e$ is emitted for a predetermined time period from a time $T_1$ at rise of the modulation signal of the image signal to a time $T_2$, the laser beams each at a light quantity level $P_p$ lower than the light quantity level $P_e$ is emitted for a predetermined time period from $T_2$ to a time $T_3$, and the laser beams each at the light quantity level $P_e$ is emitted again for a time period from $T_3$ to a time $T_4$ as a predetermined time period right before fall of the modulation signal.

That is to say, in this embodiment, the exposure is carried out with the normal exposure power obtained from the laser beams each at the light quantity level $P_p$ corresponding to the first level for the time period from $T_2$ to $T_3$, and the exposure is carried out with the exposure power in increasing the dot light quantity obtained from the laser beams each at the high light quantity level $P_e$ obtained by adding the second level (an edge power $\Delta P_e$) to the first level for each of the predetermined time period from $T_1$ to $T_2$ right after rise of the modulation signal and the predetermined time period from $T_3$ to $T_4$ right before fall of the modulation signal.

When the recording material 13 is exposed so as to form thereon a fine pattern such as a fine line, both opposite direction end portions of the fine pattern can be sufficiently exposed based on such emission of the laser beams, and hence the fine line is prevented from being thinned.

The driving of the light emitting device 14 so as to cause the semiconductor laser diodes to emit the laser beams by changing the light quantity level (exposure power) over to another one in such a manner is controlled by the light quantity adjusting apparatus 22 including the drive signal generating portion 34 and the light quantity level setting portion 36. The light quantity adjusting apparatus 22 will hereinafter be described.

Figure 3:
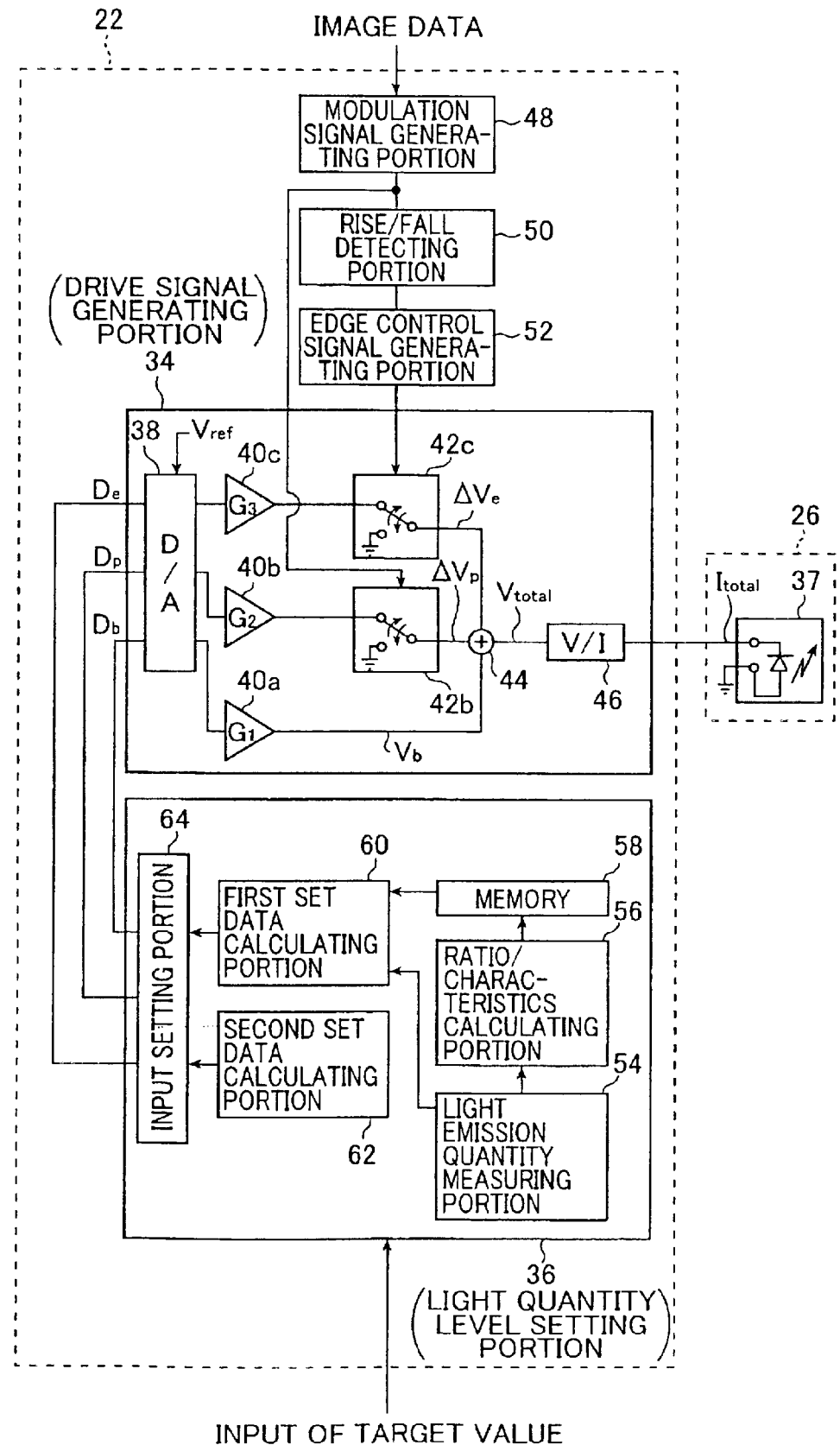
FIG. 3 is a schematic block diagram, partly in circuit diagram, showing a configuration of a main portion of a control device connected to a semiconductor laser diode of the image forming apparatus shown in FIG. 1.

FIG. 3 is a block diagram, partly in circuit diagram, showing a schematic configuration of the light quantity adjusting apparatus 22 in this embodiment.

As described above, the light quantity adjusting apparatus 22 includes the drive signal generating portion 34 for generating the signal used to drive the light emitting device 14, and the light quantity level setting portion 36 for setting pulse set data (first set data) used to determine the first level for drive of the light emitting device 14, and edge set data (second set data) used to determine the second level to be added to the first level for drive of the light emitting device 14.

The drive signal generating portion 34 mainly includes a D/A converter 38, amplifiers 40a, 40b and 40c, switching elements 42b and 42c, an adder 44 and a V-I converting circuit 46.

The D/A converter 38 subjects bias set data $D_b$, pulse set data (first set data) $D_p$ and edge set data (second set data) $D_e$ which are inputted from the light quantity level setting portion 36 as will be described later into digital-to-analog conversion in N bits to generate an analog voltage signal of the bias set data $D_b$, an analog voltage signal of the pulse set data $D_p$, and an analog voltage signal of the edge set data $D_e$.

The amplifiers 40a, 40b and 40c amplify the analog signals thus generated at amplification factors $G_1$, $G_2$ and $G_3$, respectively. A bias signal outputted from the amplifier 40a is supplied to the adder 44, a pulse voltage signal outputted from the amplifier 40b is supplied to the switching element 42b, and an edge voltage signal outputted from the amplifier 40c is supplied to the switching element 42c.

In addition, the light quantity adjusting apparatus 22 further includes a modulation signal generating portion 48, a rise/fall detecting portion 50 and an edge control signal generating portion 52.

The modulation signal generating portion 48 generates a modulation signal from the image data inputted to the light quantity adjusting apparatus 22.

The rise/fall detecting portion 50 detects a rise portion and a fall portion of the modulation signal. The edge control signal generating portion 52 generates an edge control signal based on a detection signal from the rise/fall detecting portion 50.

The modulation signal is inputted to the switching element 42b, and the edge control signal is inputted to the switching element 42c.

The switching element 42b switches connection and non-connection to the adder 44 over to each other based on the modulation signal, and the switching element 42c switches connection and non-connection to the adder 44 over to each other based on the edge control signal.

The adder 44 adds a pulse voltage signal $\Delta V_p$ supplied in correspondence to the switching operation of the switching element 42b, and an edge voltage signal $\Delta V_e$ supplied in correspondence to the switching operation of the switching element 42c to a bias signal $V_b$, thereby generating a drive voltage $V_{total}$.

The V-I converting circuit 46 converts the drive voltage signal $V_{total}$ inputted thereto into a drive current $I_{total}$. The drive current $I_{total}$ is inputted as a control signal to each of a plurality of semiconductor laser diodes 37 in the light source portion 26 to control the light intensities of the laser beams emitted from the semiconductor laser diodes 37. As a result, an optical output waveform as shown in FIG. 2 is obtained. A waveform of the drive voltage signal for obtaining the optical output waveform is shown in FIG. 4A, and a waveform of the drive current signal for obtaining the optical output waveform is shown in FIG. 4B.

Figure 4A:
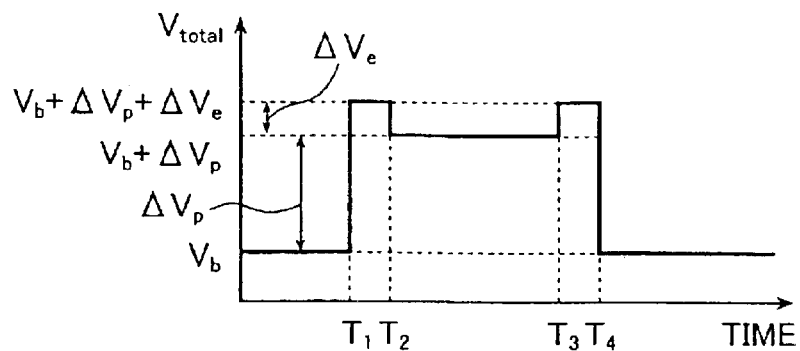
FIGS. 4A and 4B are a timing chart of a drive voltage signal when a laser beam is emitted so as to have time waveform shown in FIG. 2, and a timing chart of a drive current signal when a laser beam is emitted so as to have the time waveform shown in FIG. 2.
Figure 4B:
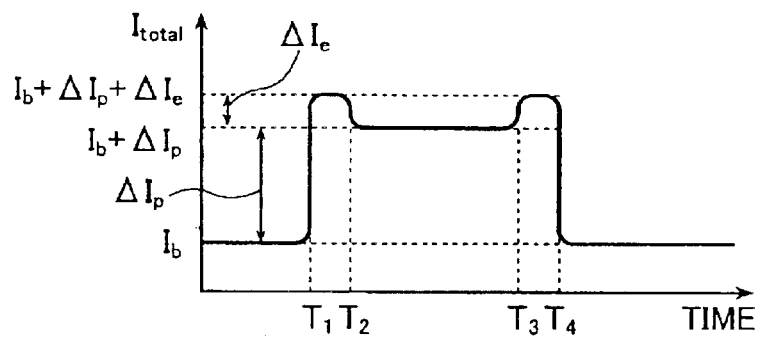

In FIGS. 4A and 4B, similarly to FIG. 2, a time $T_1$ indicates rise of the pixel modulation signal, and a time $T_4$ indicates fall of the pixel modulation signal. That is to say, an interval of $T_1 < T < T_4$ is an interval in which the pixel modulation signal is in an ON state, while an intervals of $T < T_1$ and $T_4 < T$ are intervals in each of which the pixel modulation signal is in an OFF state.

When the pixel modulation signal is in the OFF state, each of the semiconductor laser diodes 37 is controlled with the bias voltage $V_b$, and hence a bias drive current Ib having a level lower in level than an oscillation threshold is caused to flow therethrough. Thus, each of the semiconductor laser diodes 37 is in a turn-OFF state.

On the other hand, when the pixel modulation signal is in the ON state, each of the semiconductor laser diodes 37 is controlled with the voltage $V_p = V_b + \Delta V_p$ obtained by adding the pulse voltage $\Delta V_p$ to the bias voltage $V_b$, and hence the current $I_p = I_b + \Delta I_p$ in the normal exposure obtained by superposing the pulse drive current $\Delta I_p$ on the bias drive current $I_b$ is caused to flow through each of the semiconductor laser diodes 37. Thus, as shown in FIG. 2, the laser beam is emitted from each of the semiconductor laser diodes 37 at the normal exposure power $P_p$.

Moreover, for the time period in increasing the dot light quantity of $(T_2-T_1)$ right after rise of the modulation signal, and the time period in increasing the dot light quantity of $(T_4-T_3)$ right before fall of the modulation signal, each of the semiconductor laser diodes 37 is controlled with the voltage $V_{total}=V_p+\Delta V_e=V_b+\Delta V_p+\Delta V_e$ obtained by adding the edge voltage $\Delta V_e$ to the above-mentioned voltage $V_p$. Hence, the current $I_e=I_{total}=I_p+\Delta I_e=I_b+\Delta I_p+\Delta I_e$ during increase of the dot light quantity obtained by superposing the edge drive current $\Delta I_e$ on the current $I_p$ in the normal exposure is caused to flow through each of the semiconductor laser diodes 37, which is turned ON at the power $P_e$ during increase of the dot light quantity.

The adjustment for the pulse set data $D_p$ and the edge set data $D_e$ which are used to emit the laser beams so as to obtain the light quantity levels $P_p$ and $P_e$ as shown in FIG. 2 is carried out by the light quantity level setting portion 36 which will be described below.

The light quantity level setting portion 36 includes a light emission quantity measuring portion 54, a ratio/characteristics calculating portion 56, a memory 58, a first set data calculating portion 60, a second set data calculating portion 62, an input setting portion 64, and a CPU (not shown) for carrying out the control or the like for operations of those portions.

Figure 5:
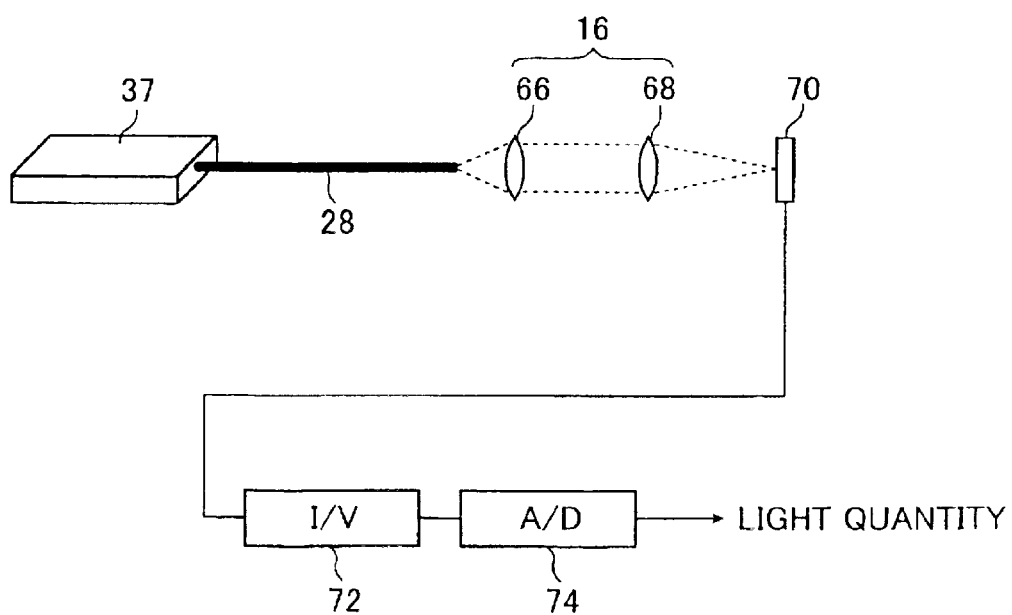
FIG. 5 is a schematic view explaining light quantity measurement used in a light quantity adjusting method of the present invention.

The light quantity measuring portion 54 measures an optical output from the laser light source, and its schematic construction is shown in FIG. 5.

As shown in FIG. 5, the light emission quantity measuring portion 54 is constructed such that the laser beam which is emitted through an optical fiber cable 28 extending from the semiconductor laser diode 37 of the light source portion 26 to be outputted through the optical system 16 including a collimator lens 66 and an image forming lens 68 is received by a light receiving surface of a photodiode 70 to be converted into an optical output signal (voltage value) in the I-V converting circuit 72 to be digitized in the A/D converter 74, thereby measuring the quantity of light (intensity of light). The measurement results are supplied to the first set data calculating portion 60 as may be necessary.

The light emission quantity measuring portion 54 measures the quantity light in the actual image recording. For example, it is preferable that the photodiode 70 for receiving the laser beam is provided by the side of the drum 12, and the light emitting portion 30 and the optical system 16 are laterally moved to the position of the photodiode 70 by a sub scanning mechanism to measure the quantity of light. However, the light emission quantity measuring portion 54 is not necessarily limited to this construction.

Referring back to FIG. 3 again, the light quantity data measured by the light emission quantity measuring portion 54 is inputted to the ratio/characteristics calculating portion 56. The ratio/characteristics calculating portion 56 calculates the light quantity characteristics and the resolution ratio. The light quantity characteristics mean characteristics representing a change in level of the quantity of light emitted from the light emitting device 14 with respect to the set data. The resolution ratio means a ratio between the resolution of the set data $D_p$ in the pulse drive current (drive current set resolution) and the resolution of the edge set data $D_e$ in the edge drive current (drive current set resolution).

The memory 58 stores therein the data of the light quantity characteristics and the resolution ratio calculated by the ratio/characteristics calculating portion 56 in advance.

The first set data calculating portion 60 adjusts and sets the pulse set data $D_p$ so that the laser beams each at the light quantity level $P_p$ shown in FIG. 2 are emitted from the light emitting device 14, and thus for the light emission quantity of the light emitting device 14, the light quantity measured by the light emission quantity measuring portion 54 agrees with a target value inputted from a manipulation system (not shown) such as a keyboard. In addition, the bias set data $D_b$ is set so as for the light emitting device 14 not to emit the laser beams.

In addition, the second set data calculating portion 62 calculates the edge set data $D_e$ so that the laser beams each at the light quantity level $P_e$ shown in FIG. 2 are emitted from the light emitting device 14 and thus the quantity of light from the light emitting device 14 agrees with a target value inputted from the manipulation system (not shown).

In addition, the input setting portion 64 is a portion for inputting the values of the pulse set data $D_p$ calculated by the first set data calculating portion 60, the edge set data $D_e$ calculated by the second set data calculating portion 62, and the bias set data $D_b$ as the set values to the D/A converter 38 of the drive signal generating portion 34.

Figure 6:
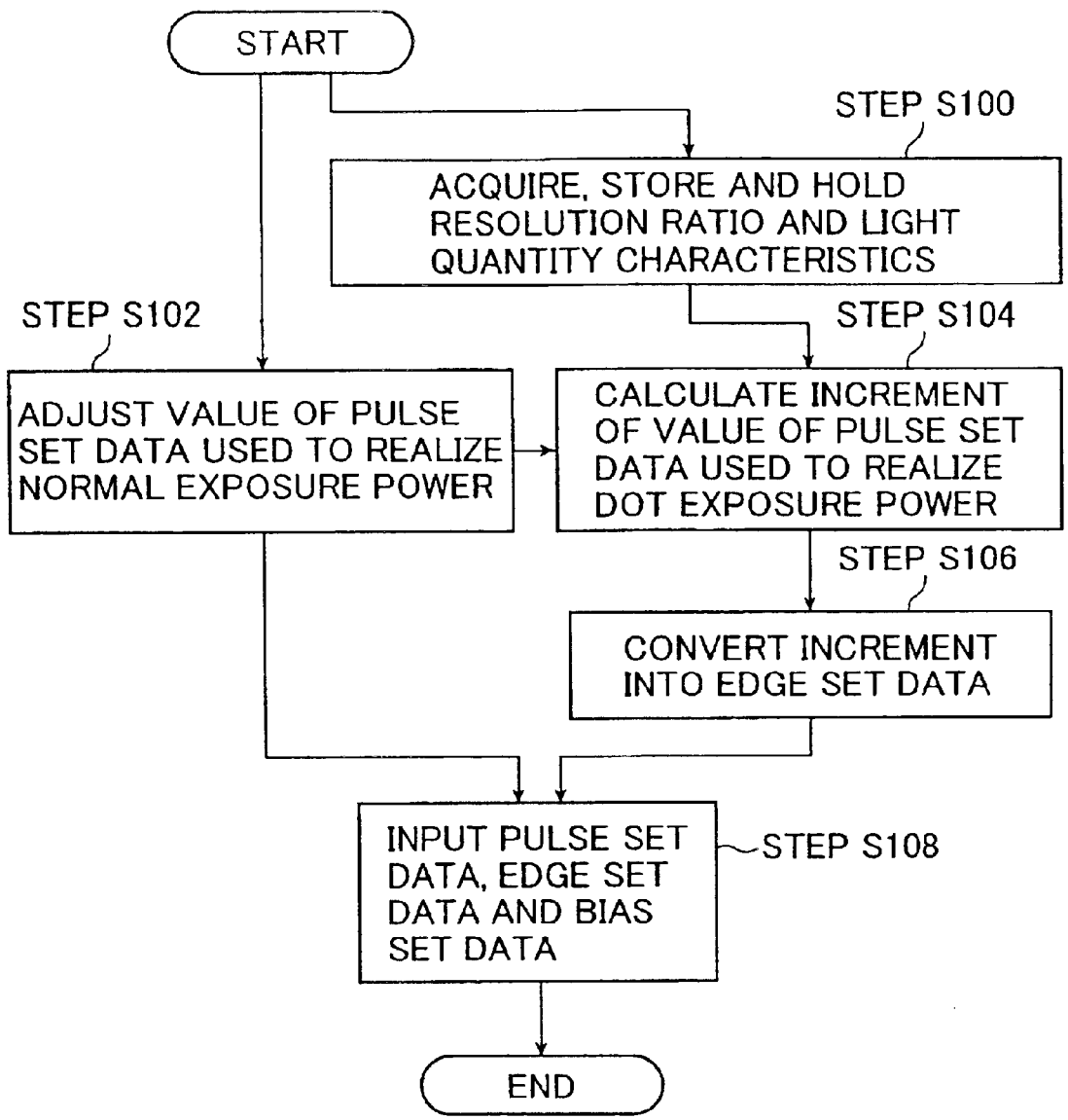
FIG. 6 is a flow chart showing the light quantity adjusting method according to an embodiment of the present invention.

FIG. 6 is a flow chart showing an embodiment of a light quantity adjusting method carried out in such an image forming apparatus 10.

First of all, the resolution ratio as the ratio between the drive current setting resolution, which means a change amount of the pulse drive current $\Delta I_p$ for a change in the pulse set data $D_p$ and the drive current setting resolution, which means a change amount of the edge drive current $\Delta I_e$ for a change in the edge set data $D_e$, and the relationship between the pulse set data $D_p$ and the light quantity of the laser beams emitted through the optical fiber cable 28 are acquired in advance to be stored and held (Step S100).

The resolution ratio is acquired in the following specific manner.

When the number of bits processed through the D/A conversion of the D/A converter 38 of the drive signal generating portion 34 is assigned $2^N$, a reference voltage is assigned $V_{ref}$, gains of the amplifiers 40b and 40c are $G_2$ and $G_3$, and a conversion coefficient in the V-I conversion circuit 46 is assigned k, the pulse drive current $\Delta I_p$ and the edge drive current $\Delta I_c$ are expressed by Equation (1) and (2), respectively:

$$\Delta I_p = k \cdot G_2 \cdot D_p/(2^N-1) \cdot V_{ref} \quad (1)$$

$$\Delta I_e = k \cdot G_3 \cdot D_e/(2^N-1) \cdot V_{ref} \quad (2)$$

That is to say, the pulse drive current $\Delta I_p$ and the edge drive current $\Delta I_e$ are proportional to the pulse set data $D_p$ and the edge set data $D_e$, respectively. The drive current setting resolution is a proportional coefficient at that time. Consequently, the resolution ratio which means the ratio of a change amount of the edge drive current $\Delta I_e$ for a change of the edge set data $D_e$ to a change amount of the edge drive current $\Delta I_e$ for a change of the edge set data $D_e$ is determined to be $G_3/G_2$ based on Equation (3):

$$\Delta D_e = (G_3/G_2) \cdot \Delta D_p \quad (3)$$

For this reason, the resolution ratio is acquired in the form of the ratio of the amplification factor $G_3$ of the amplifier 40c to the amplification factor $G_2$ of the amplifier 40b.

In the present invention, the relationship between the edge set data $D_e$ and the pulse set data $D_p$ is not limited to the case of the linear relationship having the resolution ratio as a constant as expressed in Equation (3). Thus, the resolution ratio may not be constant, and also the edge set data $D_e$ and the pulse set data $D_p$ may show the non-linear relationship. In this case, the relationship between the edge set data $D_e$ and the pulse set data $D_p$ has to be set based on circuit parameters of the drive signal generating portion 34. For example, in a case where the edge set data $D_e$ and the pulse set data $D_p$ are D/A-converted in the different numbers of bits, the different numbers of bits are contained in the circuit parameters of the information expressing the above-mentioned correspondence relationship.

In addition, the light quantity characteristics representing the relationship between the pulse set data $D_p$ and the light quantity of the laser beams emitted through the optical fiber cables 28 are acquired by the system of the light emission quantity measuring portion 54 shown in FIG. 5.

That is to say, the laser beams emitted through the optical fiber cables 28 extending from the semiconductor laser diodes 37 are received on the light receiving surface of the photodiode 70 through the collimator lens 60 and the image forming lens 68 to be converted into an optical output signal (voltage) in the I-V converting circuit 72 and digitized in the A/D converter 74, thereby measuring the quantity of light. Such measurement of the quantity of light is carried out while the pulse set data $D_p$ is variously changed, thereby measuring the light quantity characteristics.

Figure 7:
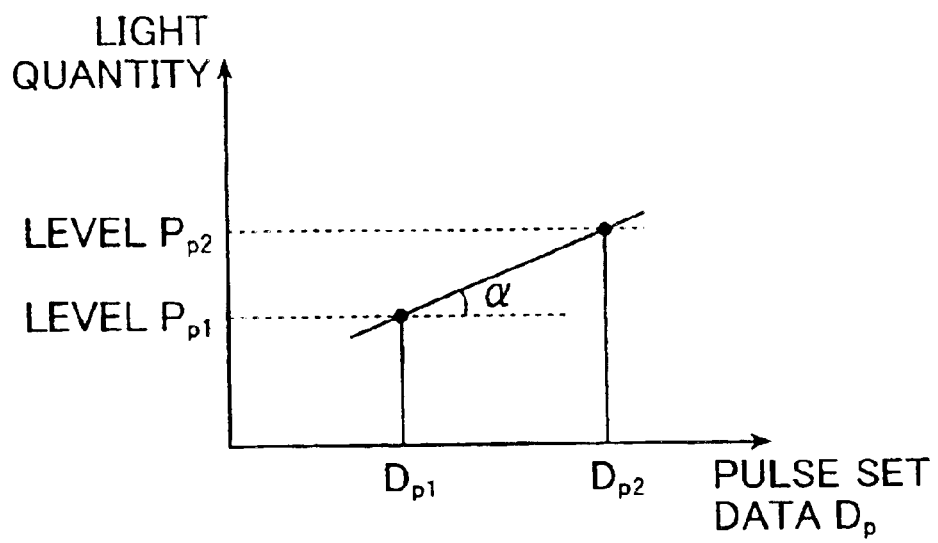
FIG. 7 is a diagram showing an example of light quantity characteristics obtained by utilizing the light quantity adjusting method of the present invention.

In the light quantity characteristics, as shown in FIG. 7, the quantity of light nearly linearly changes with respect to the pulse set data $D_p$ ($D_{p1}$, $D_{p2}$) (light quantity level: $P_{p1}$, $P_{p2}$). In FIG. 7, a change in quantity of light with respect to the pulse set data $D_p$ is regulated in the form of an inclination angle $\alpha$.

As shown in FIG. 7, the quantity of light has the characteristics of linearly changing with respect to the pulse set data $D_p$. Then, a change $\Delta P$ of the quantity of light and a change $\Delta I_{total}$ of the drive current are associated with each other in the form of Equation (4) using a proportional constant $\eta$ containing the luminous differentiation efficiency, the loss in the optical fiber cables 28 and the optical system, and the like. Thus, those characteristics are characteristics in which the relationship between the quantity of light and the pulse set data $D_p$ is linearly expressed.

$$\Delta P / \Delta I_{total} = \eta \qquad (4)$$

Note that in the light quantity adjusting method of the present invention, the quantity of light is not limited to one which linearly changes with respect to the pulse set data $D_p$.

The data of the resolution ratio and the light quantity characteristics which are obtained in a manner as described above is stored and held in the memory 58.

The semiconductor laser diode is degraded in its performance owing to the use for a long term, and in the worst case, becomes unable to emit the laser beam. In the worst case, the old semiconductor laser diode is exchanged for new one at a predetermined frequency. Then, whenever the old semiconductor laser diode is exchanged for new one, the light quantity characteristics are measured to be acquired. In addition, before the recording medium 13 is exposed to record an image thereon, the light quantity characteristics of the laser semiconductor laser diode 37 may be measured.

Next, for preliminary adjustment before the exposure and the recording are started, when the adjustment of the quantity of light is required as in a case or the like where a kind of recording medium 13 is changed over to another one, the bias set data $D_b$ for realization of the bias drive current $I_b$ having a level equal to or lower than the light emission threshold at which the semiconductor laser diode 37 emits no laser beam is adjusted and set. Also, a value $D_p'$ (refer to FIG. 8) of the pulse set data $D_p$ is adjusted based on the bias set data $D_b$ (Step S102) so that the laser beam is emitted at a light quantity level $P_p'$ (first target value) when the recording medium 13 is exposed to record a desired pattern thereon with the normal exposure power with which a portion other than the exposure and recording edges is exposed.

Figure 8:
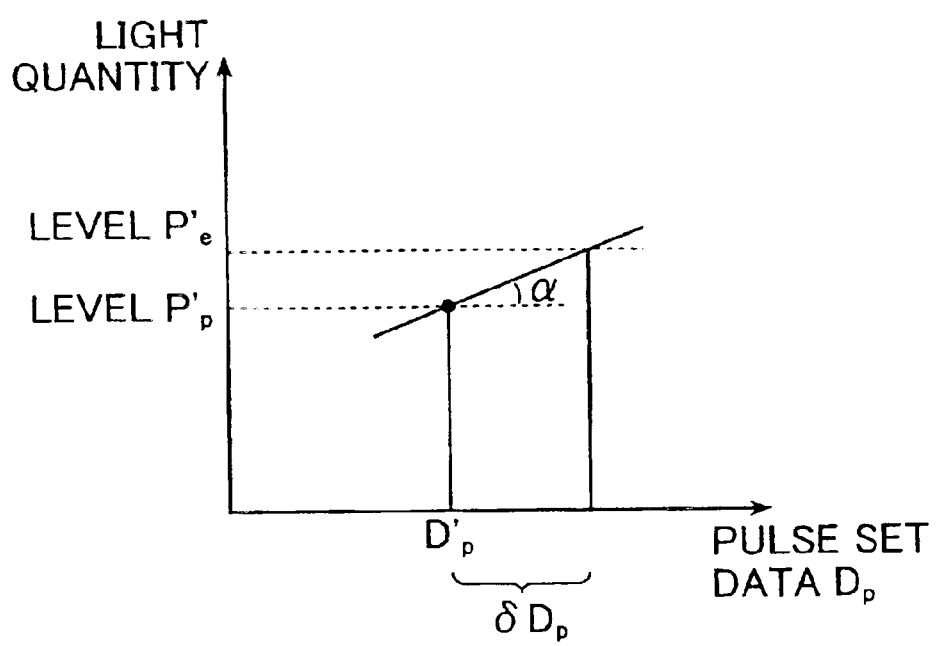
FIG. 8 is a diagram explaining a method of calculating an increment in pulse set data used to realize a dot exposure power based on a light quantity level and light quantity characteristics in the dot exposure power in the light quantity adjusting method shown in FIG. 5.

On the other hand, an increment $\delta D_p$ from the value $D_p'$ is calculated so as to obtain the agreement with a light quantity level $P_e$ (second target value) from an inputted value ($P_e'$) of the light quantity level $P_e$ in the dot exposure power at the exposure recording edge, and the light quantity characteristics the data of which is stored and held in the memory 58 (Step S104) i.e., so as to realize the dot exposure power as shown in FIG. 8.

Next, the calculated increment $\delta D_p$ is converted into the edge set data $D_e$ using the resolution ratio $G_3/G_2$ expressed in Equation (3) to calculate the value $D_e'$ (Step S106). More specifically, the resolution ratio $G_3/G_2$ is multiplied by the increment $\delta D_p$ to calculate the value $D_e'$.

Thus, the value of the bias set data $D_b$ set in Step S102, the value $D_p'$ calculated in Step S102, and the value $D_e'$ calculated in Step S106 are inputted as the value of the bias set data $D_b$, the value of the pulse set data $D_p$ and the value of the edge set data $D_e$ in the drive signal generating portion 34 (Step S108).

So long as the value of the bias set data $D_b$ and the value of the pulse set data $D_p$ are adjusted once in Step S102 in such a manner, the edge set data $D_e$ for realization of the dot exposure power can be automatically calculated and set. Consequently, in a case where the adjustment is carried out whenever the exposure and recording are carried out, whenever the recording material is changed, or whenever a kind of recording material is changed, and a plurality of recording materials are processed in large quantities, the two adjustment processes having the adjustment of the pulse set data and the adjustment of the edge adjustment data as in the conventional art are not required and hence the pulse set data has only to be adjusted once. For this reason, the number of times of the adjustments for the quantity of light can be reduced and thus the processing for the image exposure and recording can be executed for a short time period. Hence, the excellent productive efficiency can be obtained.

Figure 9:
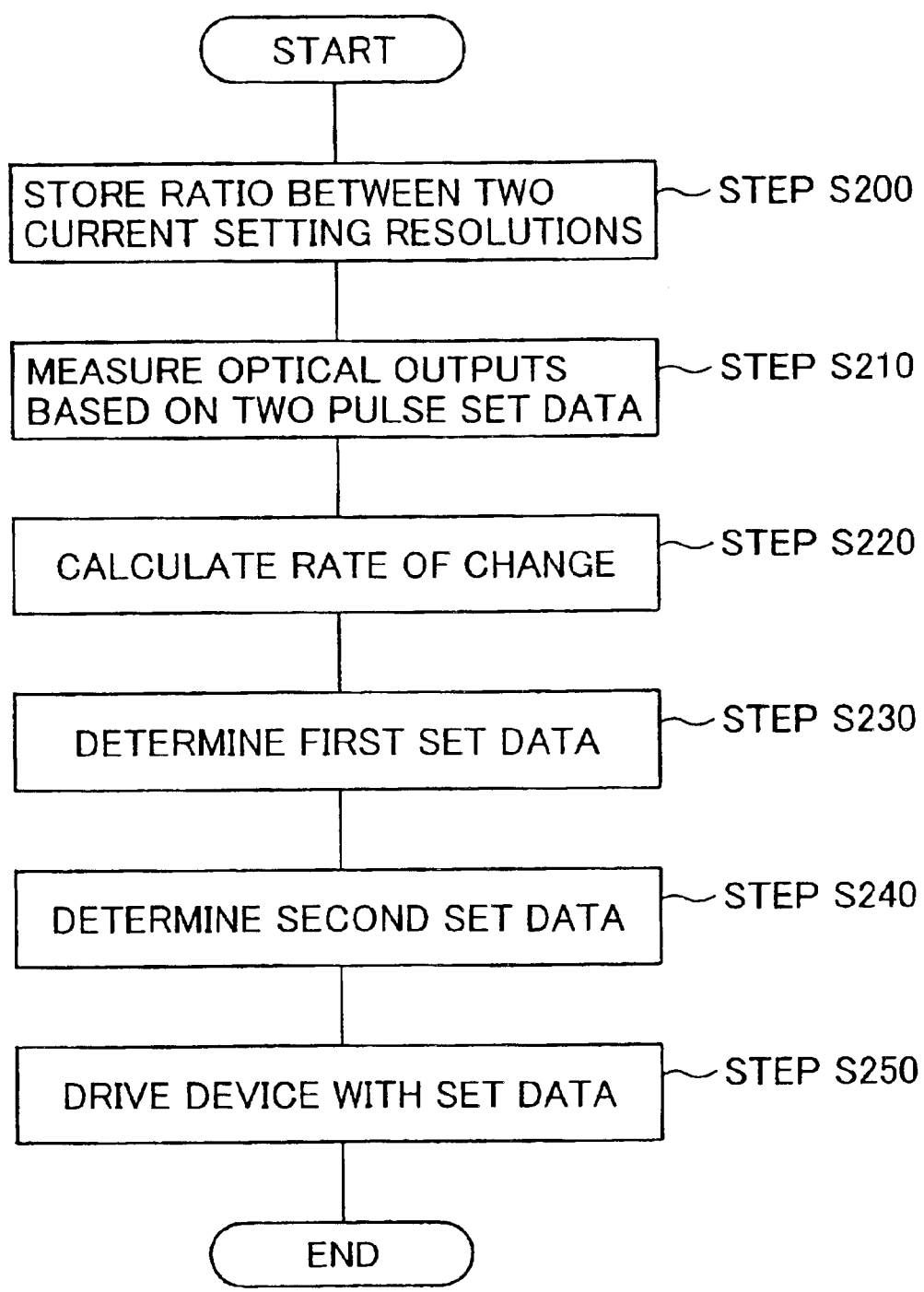
FIG. 9 is a flow chart showing a flow in the light quantity adjusting method according to another embodiment of the present invention.

On the other hand, FIG. 9 is a flow chart showing another embodiment of the light quantity adjusting method carried out in the image forming apparatus 10.

First of all, the ratio between the current setting resolution per digit of the pulse set data used to determine the light quantity level $P_p$ (first level) shown in FIG. 2, and the current setting resolution per digit of the pulse set data used to determine the light quantity level $\Delta P_e$ shown in FIG. 2 is stored in the memory 58 of the light quantity level setting portion 36 in advance (Step S200).

The current setting resolution used to determine the light quantity level $P_p$, as described above, is a resolution of a current per digit of the pulse set data for setting of the current value corresponding to the normal exposure power. Also, the current setting resolution used to determine the light quantity level $\Delta P_e$, as described above, is a resolution of a current per digit of the pulse set data for setting of the current value corresponding to the exposure power for an increase of the dot light quantity.

When the laser drive current $I_{total}$ has the current value higher in level than the oscillation threshold $I_{th}$ of the semiconductor laser diode, the laser drive current $I_{total}$ and the optical output signal $P$ show the linear relationship as expressed in Equation (4).

On the other hand, in the circuit shown in FIG. 3, the relationship between the pulse set data $D_p$ and the pulse current $\Delta I_p$, and the relationship between the edge set data $D_e$ and the edge current $\Delta I_e$ are expressed by Equations (1) and (2), respectively.

In addition, when an increment of the laser drive current corresponding to an increment $\Delta P_0$ of a certain optical output is intended to be realized using the pulse current $\Delta I_o$ and the edge current $\Delta I_e$, a ratio of an increment $\Delta D_e$ of the edge current set data to an increment $\Delta D_p$ of the pulse current set data is expressed by Equation (3).

This ratio $G_2/G_3$ is a value which is uniquely determined as a design parameter of a drive circuit. This value is stored as the ratio of the resolution in the current setting resolution of the edge set data to the pulse set data.

In addition, the increment $\Delta I_0$ of the laser drive current corresponding to the increment $\Delta P_0$ of the optical output is realized using the pulse current. A relationship between the increment $\Delta P_0$ of the optical output and the increment $\Delta D_p$ of the pulse current set data can be expressed by Equation (5):

$$\Delta P_0 = \eta \cdot \Delta I_0 = \alpha \cdot \Delta D_p \quad (5)$$

where $\alpha$ is expressed by $\{\eta \cdot k \cdot G_2/(2^N-1)\} \cdot V_{ref}$ and thus is proportional to $\eta$, and $\eta$ is a value containing the light emission differentiation efficiency of the semiconductor laser diode. $\eta$ containing the luminous differentiation efficiency, i.e., $\alpha$ changes owing to the temperature characteristics, the time-dependent change or the like of the semiconductor laser diode.

First of all, the light quantity setting resolution per digit of the pulse set data is measured, and at the same time, the quantity of light corresponding to the normal exposure power is adjusted.

The predetermined bias set data $D_b$ is set, and the bias current $I_b$ is then caused to flow through each of the semiconductor laser diodes. Next, such two pulse set data $D_{p1}$ and $D_{p2}$ are set that the drive current obtained by adding the pulse current $\Delta I_p$ to the bias current $I_b$ is higher in level than the laser oscillation threshold current $I_{th}$, but does not exceed a rated current of each of the semiconductor laser diodes, and optical outputs $P_1$ and $P_2$ at this time are measured, respectively (Step S210).

That is to say, two pulse set data is set, and the two optical outputs of the light emission device 14 at that time are measured by the light emission quantity measuring portion 54. The two pulse set data is set as such data that as described above, the pulse current is higher in level than the laser oscillation threshold current $I_{th}$, but does not exceed the rated current of each of semiconductor laser diodes.

The actual measurement for the two pulse set data is carried out every exposure of a plate such as a PS plate.

Figure 10:
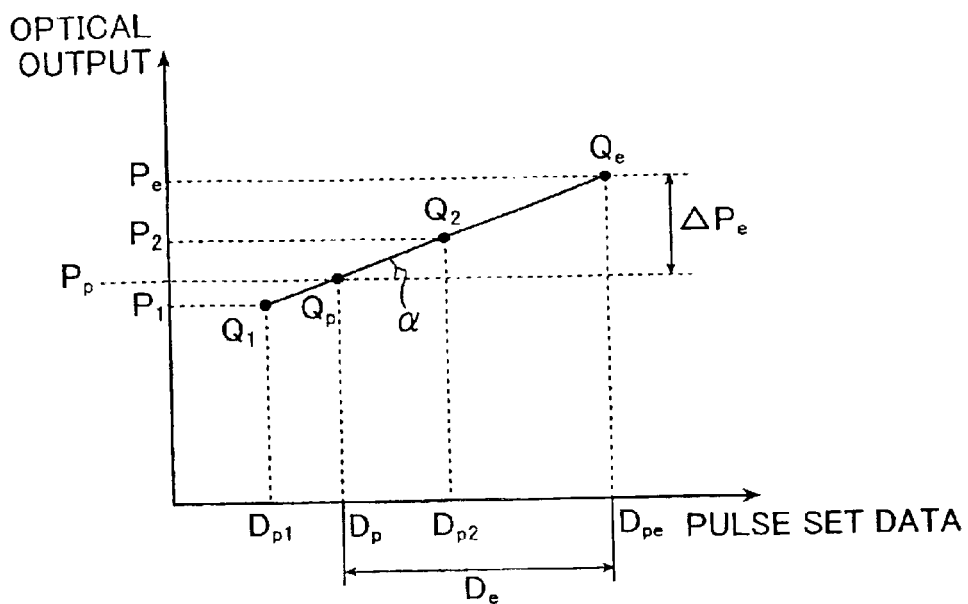
FIG. 10 is a diagram explaining a method of determining first set data and second set data in the light quantity adjusting method shown in FIG. 9.

Next, a rate of change in light emission quantity of the light emission device 14 with respect to the set data is calculated (Step S220). Points $Q_1$ and $Q_2$ are plotted on the coordinate plane in which when two pulse set data are assigned $D_{p1}$ and $D_{p2}$, and light emission quantities of the light emission device 14 at that time are assigned $P_1$ and $P_2$, as shown in FIG. 10, the pulse set data is plotted on the axis of abscissa and the optical output is plotted on the axis of ordinate.

At this time, a straight line connecting the two points $Q_1$ and $Q_2$ shows the characteristics of the optical output of the light emission device 14 to the pulse set data. A gradient of this straight line (tangential of an inclination angle $\alpha$ of this straight line with the horizontal direction in FIG. 10) is the desired rate of change of the light emission quantity. That is to say, the desired rate of change is calculated (Step S220). The inclination angle $\alpha$ is a value on which the luminous differentiation efficiency in this case is reflected. That is, the inclination angle $\alpha$ represents the drive current setting resolution for the pulse set data.

The calculated rate of change of the light emission quantity is stored in the memory 58.

Next, first set data corresponding to the normal exposure power as the first level is determined in the first set data calculating portion 60 (Step S230).

Thus, a target value $P_p$ at the first level is inputted through the manipulation system (not shown). As a result, the first set data calculating portion 60 obtains a point $Q_p$ becoming this target value (the normal exposure power $P_p$) on the above-mentioned straight line as shown in FIG. 9. Thus, pulse set data (first set data) $D_p$ is calculated in which the optical output becomes the normal exposure power as the target value.

Next, a dot light quantity increase amount as second set data is determined so as to become a target value in the second set data calculating portion 62 (Step S240). The target value of the light quantity light which increases owing to the increase in the dot light quantity is inputted through the manipulation system (not shown). The second set data calculating portion 62 obtains a point $Q_e$ becoming a target value $P_e$ which increases owing to the increase in the dot light quantity on the straight line containing the two points $Q_1$ and $Q_2$ shown in FIG. 10. Thus, pulse set data (edge set data) $D_{pe}$ corresponding to the point $Q_e$ is calculated.

Moreover, the second set data calculating portion 62 calculates edge set data (second set data) $D_e$ required to superpose a power amount of the increase in the dot light quantity as an edge power $\Delta P_e$ shown in FIG. 10 from the pulse set data stored in the memory 58 and the ratio between the two current set resolutions.

For pulse set data $(D_{pe}-D_p)$ corresponding to an edge power $(\Delta P_e = P_e - P_p)$, the edge set data $D_e$ is obtained from Equation (3) in the form of Equation (6):

$$D_e = (G_2/G_3)(D_{pe}-D_p) \quad (6)$$

Here, a value of $G_2/G_3$ is stored as the ratio of current setting resolution of the edge set data to current setting resolution of the pulse set data in the memory 58 in advance. Thus, this value is substituted for Equation (6) to determine the edge set data (second set data) $D_e$ corresponding to the edge power of $\Delta P_e = P_e - P_p$ (Step S240).

Note that though the light quantity setting resolution per digit in the pulse set data fluctuates owing to the temperature characteristics, the time-dependent change or the like of the semiconductor laser diode, the ratio between the setting resolutions does not fluctuate.

The set data determined in such a manner is inputted in the form of the first set digital data $D_p$ and the second set digital data $D_e$ as the set values together with the bias set data $D_b$ to the D/A converter 38 of the drive signal generating portion 34 by the input setting portion 64 to be outputted as the drive currents corresponding to the individual set data from the drive signal generating portion 34 to the light source portion 26. On the other hand, the light emission device 14 is driven at a timing based on the detection signal of the rise/fall detecting portion 50, and the edge control signal generated based on that detection signal (Step S250).

As described above, in this embodiment, such two pulse set data are set that the pulse current is higher in level than the laser oscillation threshold current, but does not exceed the rated current of each of the semiconductor laser diodes, the optical outputs at that time are measured, respectively, and the pulse set data in which the optical output becomes the normal exposure power as the target value is calculated on the straight line connecting the two points obtained through the measurement to determine the pulse set data for the normal exposure power, thereby serving both the light quantity adjustment for the normal exposure power, and the measurement of the light quantity setting resolution per digit of the pulse data.

Figure 11:
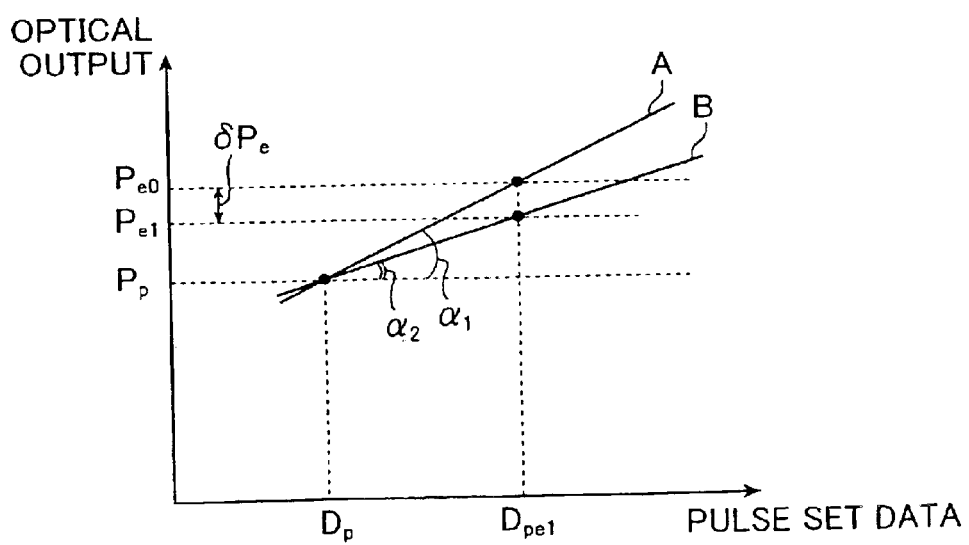
FIG. 11 is a diagram explaining a problem in a case where the embodiment is not used in order to show an effect of the light quantity adjusting method shown in FIG. 9.

On the other hand, when the data of the light quantity setting resolution per digit of the pulse set data is merely stored in the memory 58 once conventionally, and the pulse set data is then determined using that light quantity setting resolution, that light quantity setting resolution is an initial value in installation or exchange of the semiconductor laser diode as being expressed as an inclination angle $\alpha_1$ of a characteristic straight line A defined between the set data and the optical output in FIG. 11. In actual, however, the luminous differentiation efficiency of the semiconductor laser diode fluctuates owing to the temperature characteristics and the time-dependent change of the semiconductor laser diode. That is to say, the light quantity setting resolution per digit of the pulse set data changes from the initial inclination angle (initial value) $\alpha_1$ which is stored in the memory 58, and thus changes so as to become an inclination angle $\alpha_2$ for example of a straight line B representing the characteristics between the actual set data and the optical output.

For this reason, the pulse set data $D_{pe}$ required to superpose the power for the increase in the dot light quantity derived using the initial inclination angle $\alpha_1$ of the light quantity setting resolution is different from the actually required set data. Thus, an error occurs between the target power in increasing the dot light quantity and the power which is actually outputted from the semiconductor laser diode.

That is to say, when as shown in FIG. 11, for the target value $P_{e0}$ for an increase amount of dot light quantity, the necessary pulse data $D_{pe}$ is obtained based on the inclination angle $\alpha_1$, the necessary pulse data $D_{pe}$ is obtained as the data $D_{pe1}$. However, since the actual light quantity set resolution corresponds to the inclination angle $\alpha_2$, the optical output when $D_{pe1}$ is set to $P_{e1}$, and thus the optical output becomes a value which is lower than the target value by $\delta P_e$. Consequently, an error of $\delta P_e$ occurs between the target value and the actual optical output.

However, as described above, according to this embodiment, the measurement is actually carried out for the two set data every plate exposure to serve both as the light quantity adjustment of the normal exposure power and the measurement of the light quantity setting resolution per digit of the pulse set data using the measurement results. Hence, it is possible to remove an error of exposure power in increasing the dot light quantity, the error caused by the fluctuation of the luminous differentiation efficiency of the semicondu ctor laser diode.

That is to say, even when the luminous differentiation efficiency of the semiconductor laser diode changes from the initial value, it is possible to determine the edge set data on which this change is reflected. As a result, it is possible to suppress the error between the target light quantity and the actual output power due to the fluctuation of the luminous differentiation efficiency which occurs when the edge set data is calculated from the initial value.

While the light quantity adjusting method, the light quantity adjusting apparatus and the image forming apparatus of the present invention have been described in detail, it is to be understood that the present invention is not intended to be limited to the above-mentioned embodiments, and thus the various improvements and changes may be made without departing from the subject matter of the present invention.

What is claimed is:

1. A light quantity adjusting method, which is used for driving a light emitting device with a drive current at a first level which is generated in accordance with a modulation signal based on an image signal, and driving said light emitting device with a drive current obtained by adding a drive current at a second level to the drive current at the first level for at least one or both of a predetermined time period right after rise of the modulation signal and a predetermined time period right before fall of the modulation signal, said light quantity adjusting method comprising the steps of:

storing a resolution ratio between a drive current setting resolution of first set data used to determine the drive current at the first level and a drive current setting resolution of second set data used to determine the drive current at the second level;

measuring light emission quantities of said light emitting device based on predetermined two set data which are set in advance to become higher in level than an oscillation threshold current of said light emitting device, but not to exceed in level a rated current of said light emitting device in adjustment of the light quantity, respectively, to calculate and store rates of change in light emission quantity of said light emitting device for the predetermined two set data; and calculating a value in the first set data as a first set value so that the light emission quantity of said light emitting device corresponding to the drive current at the first level agrees with a target value using the rate of change of the light emission quantity on a straight line connecting two points corresponding to the two set data obtained through the measurement, and calculating a value in the second set data as a second set value so that the light emission quantity of said light emitting device corresponding to the drive current at the second level agrees with a target value using the resolution ratio and the rate of change in the light emission quantity on the straight line, thereby driving said light emitting device with the drive current at the first level and the drive current at the second level which are determined based on the first set value and the second set value obtained through the calculation to carry out the light quantity adjustment by which an error due to degradation or time-dependent change of a light emission efficiency is suppressed.

2. The light quantity adjusting method according to claim 1, wherein the rate of change in the light emission quantity of said light emitting device obtained through the calculation is a rate of change for the first set data, and the calculation of the second set value is carried out by calculating a change amount, from the first set value in the first set data, by which the light emission quantity of said light emitting device corresponding to the added drive current by the drive current at the second level agrees with the target value using the rate of change in the light emission quantity to convert the calculated change amount into the value in the second set data using the resolution ratio.

3. A light quantity adjusting apparatus for driving a light emitting device with a drive current at a first level generated in accordance with a modulation signal which is generated from an image signal, and a drive current obtained by adding a drive current at a second level to the drive current at the first level, said light quantity adjusting apparatus comprising:

light emission quantity measuring means for measuring light emission quantities of said light emitting device based on predetermined two set data which are set in advance to become higher in level than an oscillation threshold current of said light emitting device, but not to exceed in level a rated current;

change rate calculating means for calculating a rate of change in a light emission quantity of said light emitting device for the predetermined two set data;

storage means for storing a resolution ratio between a drive current setting resolution of first set data used to determine the drive current at the first level and a drive current setting resolution of second set data used to determine the drive current at the second level, and a rate of change in a light emission quantity of said light emitting device;

a first set data calculating means for calculating a value in the first set data as a first set value so that the light emission quantity of said light emitting device corresponding to the first level agrees with a target value using the rate of change in the light emission quantity on a straight line connecting two points corresponding to the two set data obtained through the measurement by said light emission quantity measuring means; and a second set data calculating means for calculating a value in the second set data as a second set value so that the light emission quantity of said light emitting device corresponding to the added drive current by the drive current at the second level agrees with a target value using the resolution ratio between the two drive current setting resolutions and the rate of change in the light emission quantity on the straight line.

4. The light quantity adjusting apparatus according to claim 3, further comprising detection means for detecting rise and fall of the modulation signal, wherein said light emitting device is driven with the drive current at the first level generated in accordance with the modulation signal which is generated from the image signal and said light emitting device is driven with the drive current obtained by adding the drive current at the second level to the drive current at the first level for one or both of a predetermined time period right after the rise of the modulation signal and a predetermined time period right before the fall of the modulation signal to carry out the light quantity adjustment by which an error due to degradation or time-dependent change of a light emission efficiency is suppressed.

5. The light quantity adjusting apparatus according to claim 3, wherein the rate of change in the light emission quantity of said light emitting device obtained through the calculation by said change rate calculating means is a rate of change for the first set data, and the calculation of the second set value by said second set data calculating means is carried out by calculating a change amount, from the first set value in the first set data, by which the light emission quantity of said light emitting device corresponding to the added drive current by the drive current at the second level agrees with the target value using the rate of change in the light emission quantity to convert the calculated change amount into the value in the second set data using the resolution ratio.

6. An image forming apparatus for forming an image on a recording material using a light beam, comprising:

light emitting means having a light emitting device for emitting a light beam with a drive current generated in accordance with a modulation signal which is generated from an image signal;

moving means for moving the recording material relative to said light emitting device; and a light quantity adjusting apparatus for driving said light emitting device with a drive current at a first level generated in accordance with the modulation signal based on the image signal, and a drive current obtained by adding a drive current at a second level to the drive current at the first level, said light quantity adjusting apparatus comprising:

light emission quantity measuring means for measuring light emission quantities of said light emitting device based on predetermined two set data which are set in advance to become higher in level than an oscillation threshold current of said light emitting device, but not to exceed in level a rated current;

change rate calculating means for calculating a rate of change in a light emission quantity of said light emitting device for the predetermined two set data;

storage means for storing a resolution ratio between a drive current setting resolution of first set data used to determine the drive current at the first level and a drive current setting resolution of second set data used to determine the drive current at the second level, and a rate of change in a light emission quantity of said light emitting device;

a first set data calculating means for calculating a value in the first set data so that the light emission quantity of said light emitting device corresponding to the first level agrees with a target value using the rate of change in the light emission quantity on a straight line connecting two points corresponding to the two set data obtained through the measurement by said light emission quantity measuring means;

a second set data calculating means for calculating a value in the second set data so that the light emission quantity of said light emitting device corresponding to the added drive current by the drive current at the second level agrees with a target value using the resolution ratio between the two drive current setting resolutions and the rate of change in the light emission quantity on the straight line; and detection means for detecting rise and fall of the modulation signal.

* * * * *

UNITED STATES PATENT AND TRADEMARK OFFICE
Certificate

Patent No. 6,949,891 B2　　　　　　　　　　　　　　　　　　Patented: September 27, 2005

On petition requesting issuance of a certificate for correction of inventorship pursuant to 35 U.S.C. 256, it has been found that the above identified patent, through error and without any deceptive intent, improperly sets forth the inventorship.
　Accordingly, it is hereby certified that the correct inventorship of this patent is: Atsuko Shimizu, Kanagawa (JP); and Takayuki Uemura, Kanagawa (JP).

Signed and Sealed this Fifth day of May 2009.

DOUGLAS W. OWENS
*Supervisory Patent Examiner*
Art Unit 2821